United States Patent [19]
Peters et al.

[11] Patent Number: 5,850,068
[45] Date of Patent: Dec. 15, 1998

[54] FOCUS CONTROL OF LASERS IN MATERIAL PROCESSING OPERATIONS

[75] Inventors: Christopher Nicholas David Peters, Rugby; Julian D C Jones, West Linton; Duncan Paul Hand, Edinburgh; Francis Martin Haran, Horfield, all of United Kingdom

[73] Assignee: Lumonics Ltd., United Kingdom

[21] Appl. No.: 867,813

[22] Filed: Jun. 3, 1997

[30] Foreign Application Priority Data

Jul. 6, 1996 [GB] United Kingdom .................. 9611942

[51] Int. Cl.$^6$ ............................................... B23K 26/04
[52] U.S. Cl. ............................... 219/121.83; 219/121.73
[58] Field of Search .................... 219/121.83, 121.63, 219/121.64, 121.62, 121.73; 355/53

[56] References Cited

U.S. PATENT DOCUMENTS

| | | | |
|---|---|---|---|
| 5,155,329 | 10/1992 | Terada et al. ....................... | 219/121.64 |
| 5,371,570 | 12/1994 | Morris et al. ............................. | 355/53 |
| 5,486,677 | 1/1996 | Maischner et al. ................. | 219/121.83 |
| 5,670,068 | 9/1997 | Kuriyama et al. .................. | 219/121.83 |

FOREIGN PATENT DOCUMENTS

| | | | |
|---|---|---|---|
| 60-121095 | 6/1985 | Japan .................................. | 219/121.83 |
| 63-278692 | 11/1988 | Japan .................................. | 219/121.62 |
| 93/03881 | 3/1993 | WIPO ................................ | 219/121.83 |

OTHER PUBLICATIONS

Browne, Mark A. et al. "Stage–Scanned Chromatically Aberrant Confocal Microscope for 3–D Surface Imaging" Proc SPIE Int Soc Opt, Eng; Proceedings of SPIE–The International Society of Optical Engineering, vol. 1660, No. Part 2, 10–13 Feb. 1992, pp. 532–541.

*Primary Examiner*—Geoffrey S. Evans
*Attorney, Agent, or Firm*—Nixon & Vanderhye P.C.

[57] ABSTRACT

When a laser beam interacts with a workpiece to be welded by the beam, a plume of optical radiation is generated. An apparatus and method is disclosed in which radiation from the plume is received back through a beam delivery path comprising optical elements (L1,L2) having chromatic aberration. This alters the focus of different spectral bands of the plume radiation and a discriminating aperture is formed by a face of an optical fibre (3). After passing through the fibre, the plume radiation is separated from any laser radiation and the respective powers of the different spectral bands are measured (5). By subtraction, an error signal is obtained which is used to control the focus of the laser beam.

18 Claims, 6 Drawing Sheets

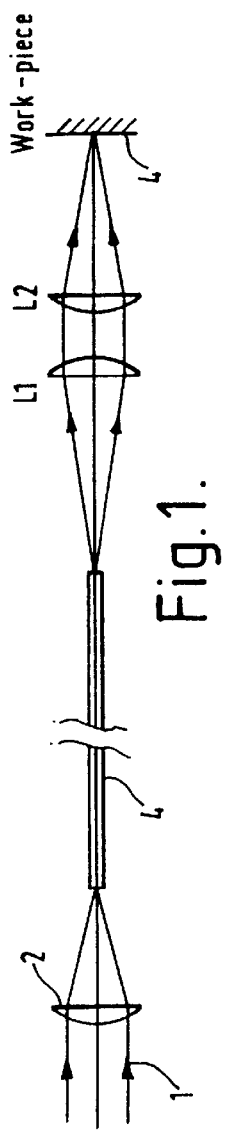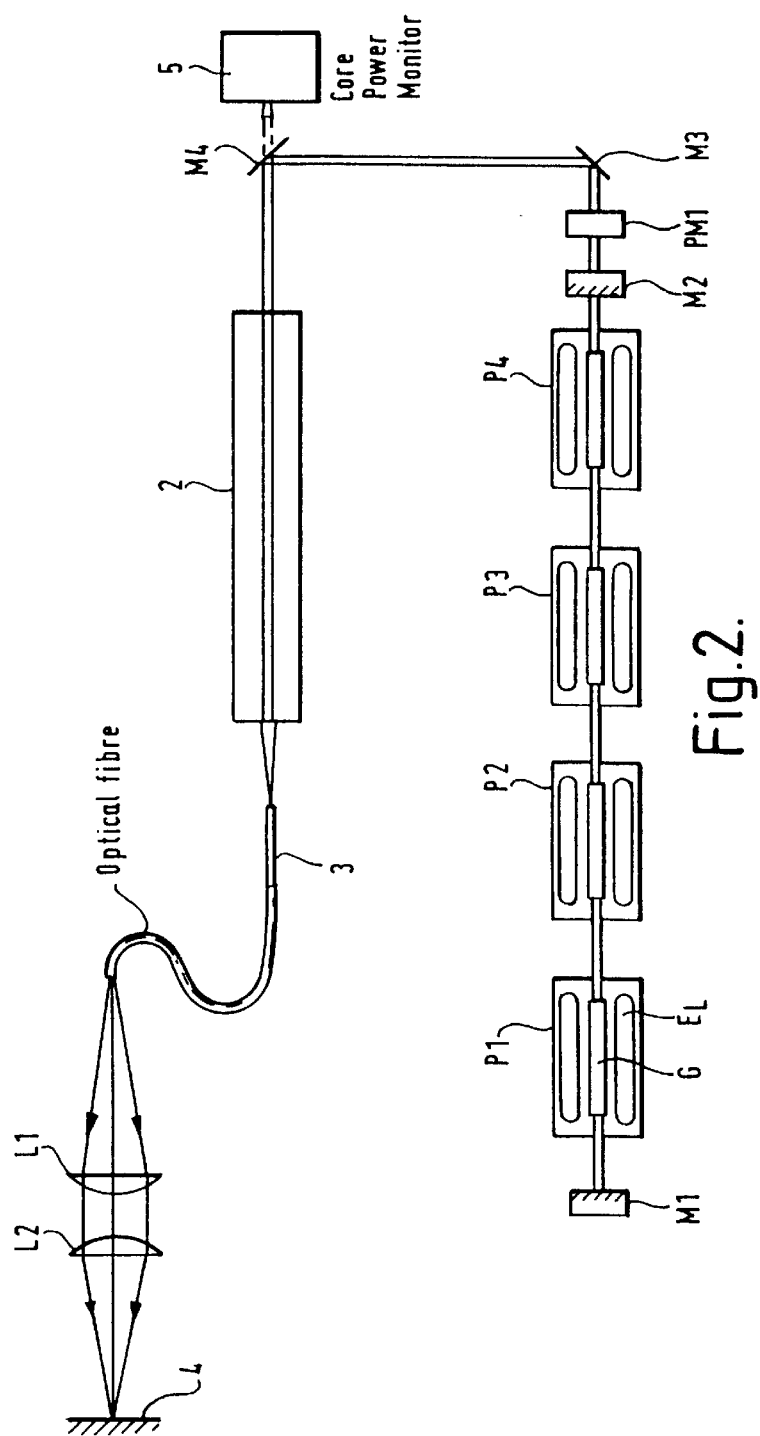

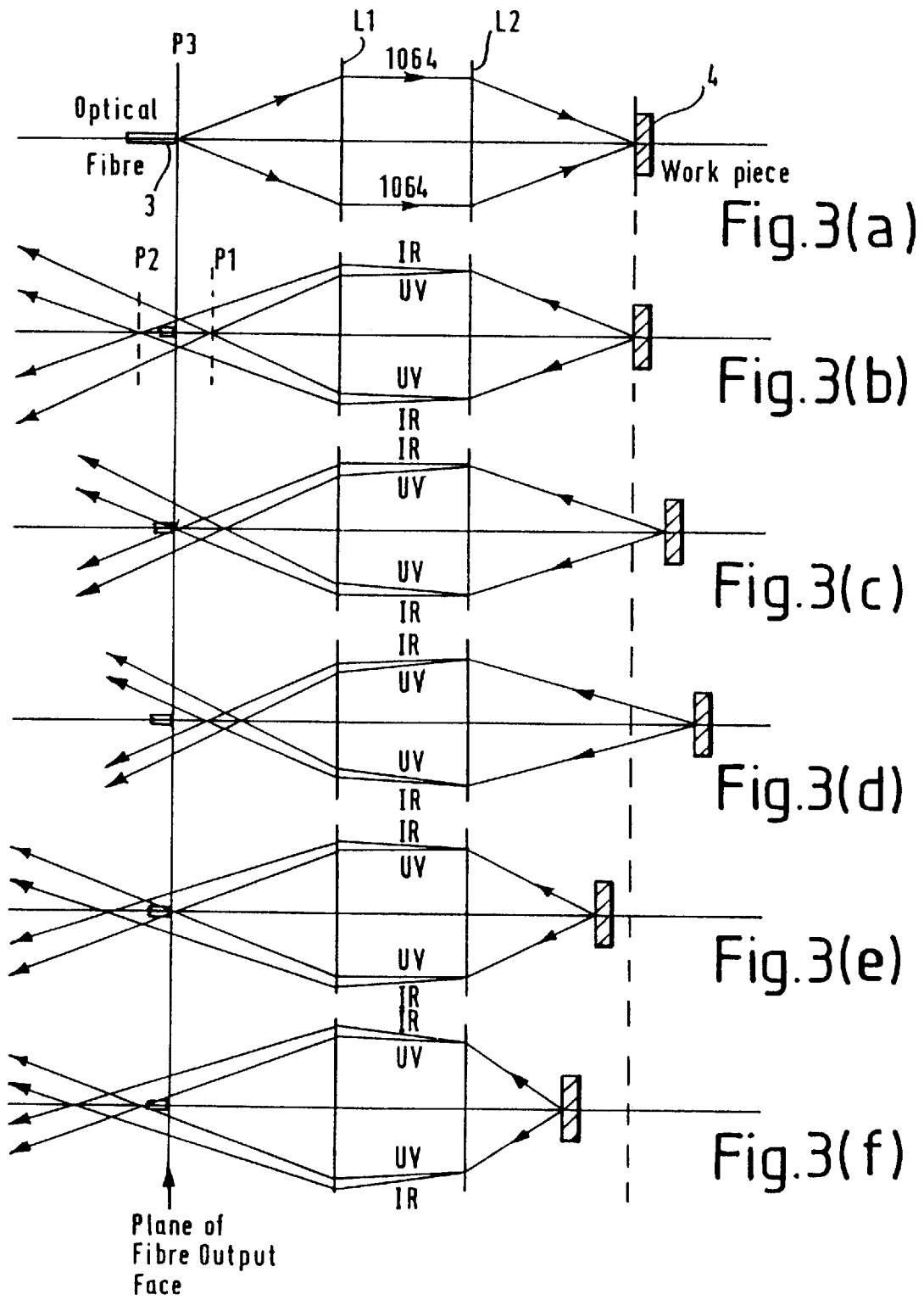

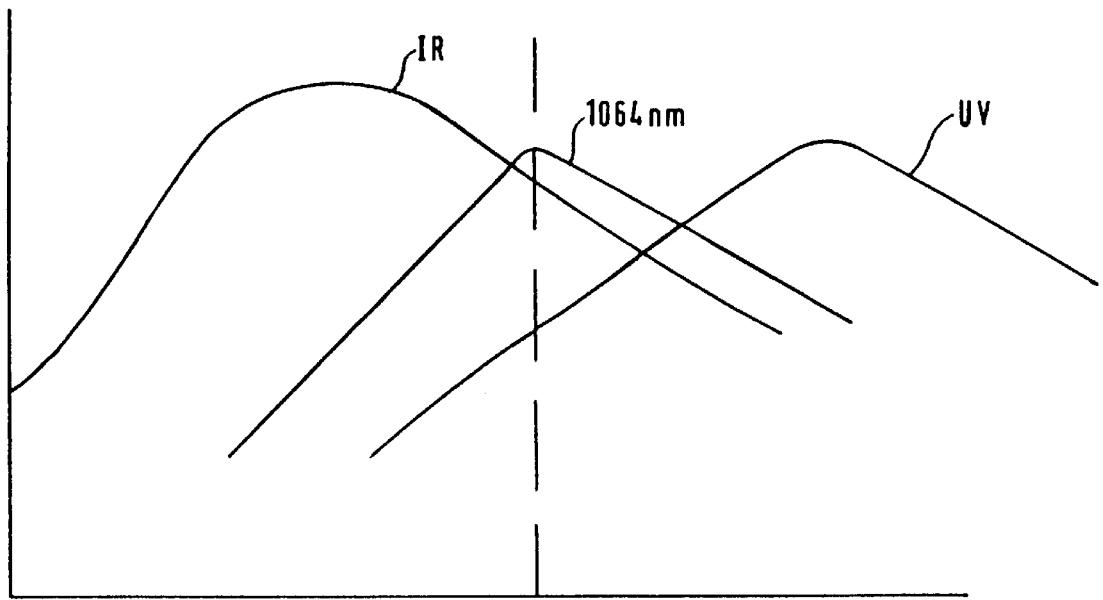
Fig.6.
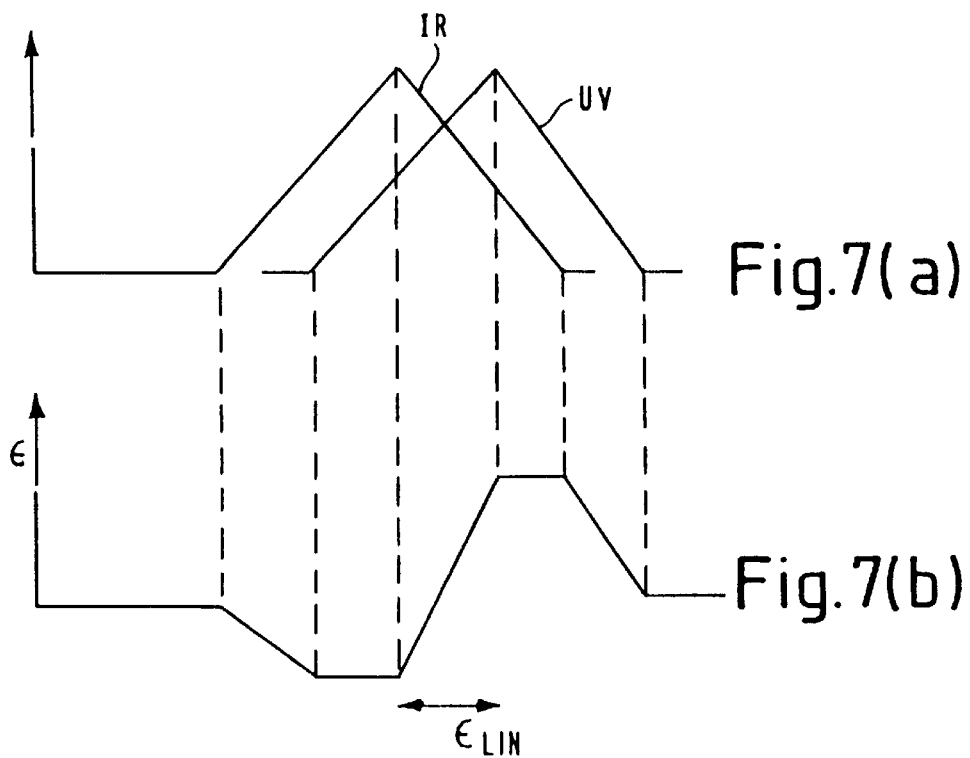
Fig.7(a)
Fig.7(b)

FOCUS CONTROL OF LASERS IN MATERIAL PROCESSING OPERATIONS

BACKGROUND OF THE INVENTION

This invention relates to focus control in laser processing of material. In particular, but not exclusively, it relates to an apparatus and method for controlling the focus in real time of a laser beam during a laser material-processing operation so that the beam remains in focus at the point of processing during an entire processing operation. The invention also relates to the monitoring of the focus of a laser beam. The processing operation may be laser welding for example or may be laser cutting or drilling or any other laser processing operation.

Laser welding is generally performed using a continuous (CW) laser beam, or a repetitively pulsed laser beam in which the focal spot of one pulse partially overlaps the focal spot of the previous pulse in an attempt to create a continuous weld as the material to be joined by welding moves laterally past the laser beam. The traditional method of laser welding uses relatively long pulses of modest peak power. The relatively long pulses allow time for applied energy to be conducted down through the thickness of metal to get a full-depth weld and the modest peak power ensures that the surface layer is not significantly vaporised. More recently, a technique of keyhole welding has been developed in which a continuous or pulsed laser beam of high peak power is used in order to vaporise the material at the focus point of a beam. This creates a hole (a keyhole) in the material. The hole is filled with plasma which is so dense that the plasma itself continues to absorb energy provided by the laser beam. As the beam traverses the material (or vice versa) the keyhole moves laterally across the material and leaves a full-depth weld bead. The focus point of the beam is crucial in this type of laser welding since, if the beam intensity at the workpiece falls due to reduction in beam power or because the beam is no longer focused on the workpiece surface, then the keyhole collapses and welding performance degrades. Correct beam focus positioning is also important in the more traditional method of laser welding since departures from the correct focus position tend adversely to affect weld width and depth.

In some cases, it is possible to preprogram the motion of the beam delivery head across the component to be welded on the basis of a known fixed configuration of the component. However, this is not always possible, particularly with components, such as pressed sheet-metal ones, which often do not have a consistent shape and are liable to flex. Also, in cases where the beam delivery head is manipulated by an articulated robot arm, only relatively poor positional accuracy can be maintained.

Methods for automatic focus control have been applied in the past, and these are often based upon capacitance measurements. In some systems, a laser beam is focused onto a workpiece via a coaxial gas nozzle which delivers a coaxial stream of oxygen or air to the process zone to enhance the effect of the laser beam on the material. By measuring the capacitance between a metallic gas nozzle and a metallic workpiece electrically, a degree of focus control can be maintained. However, electrical based sensors such as these tend to be adversely affected by high levels of electrical interference which are generated during laser welding. The method can therefore only be used with pulsed lasers and during the period between pulses to avoid interference. This is undesirable and means that the technique cannot generally be used for welding using continuous (CW) laser beams and also false readings can arise through various factors.

The present invention arose in an attempt to provide an improved automatic focus control system for a laser welding system and one which does not rely on electrical charge measurement.

SUMMARY OF THE INVENTION

According to the present invention there is provided apparatus for monitoring the focus of a laser beam; comprising a beam delivery path for delivering a laser beam to a workpiece, the beam delivery path including an optical assembly having chromatic aberration and being arranged so that at least a portion of optical radiation generated at the workpiece by virtue of interaction between the workpiece and the laser beam is transmitted back through the optical assembly; an intensity discriminating aperture; means for separating the received optical radiation, after passing through the aperture, into at least two spectral bands; means for detecting the respective powers of the received radiation of the at least two spectral bands and generating electrical signals representative of said powers, and means for generating, from the electrical signals, an error signal representative of the separation of the focus of the laser beam from the workpiece.

According to the present invention there is further provided a method of monitoring the focus of a laser beam; wherein the laser beam is delivered through a beam delivery path to a workpiece, the beam delivery path including an optical assembly having chromatic aberration and being arranged so that at least a portion of optical radiation generated at the workpiece by virtue of an interaction between the workpiece and laser beam is transmitted back through the optical assembly; which method comprises passing the generated optical radiation through a discriminating aperture; separating the optical radiation into at least two spectral bands differently affected by the aberration of the optical assembly; detecting the respective powers of the radiation of the at least two spectral bands at the aperture and generating therefrom an error signal representative of the separation of the focus of the laser beam from the workpiece.

DESCRIPTION OF THE DRAWINGS

Embodiments of the invention will now be described, by way of example only, with reference to the accompanying drawings in which:

FIG. 1 shows schematically an optical fibre and lens arrangement for directing a laser beam to a workpiece;

FIG. 2 shows a laser welding arrangement including a core power monitor;

FIGS. 3(a) to (f) are explanatory diagrams showing the effect on different spectral bands of a lens arrangement having chromatic aberration, and varying the workpiece position;

FIG. 6 shows a graph of the effect of altering workpiece position on radiation of different spectral bands;

FIG. 7(a) shows an approximated version of part of FIG. 6 and FIG. 7(b) shows a subtraction signal of the two signals of FIG. 7(a)

DESCRIPTION OF PREFERRED EMBODIMENTS OF THE INVENTION

Figure 4:
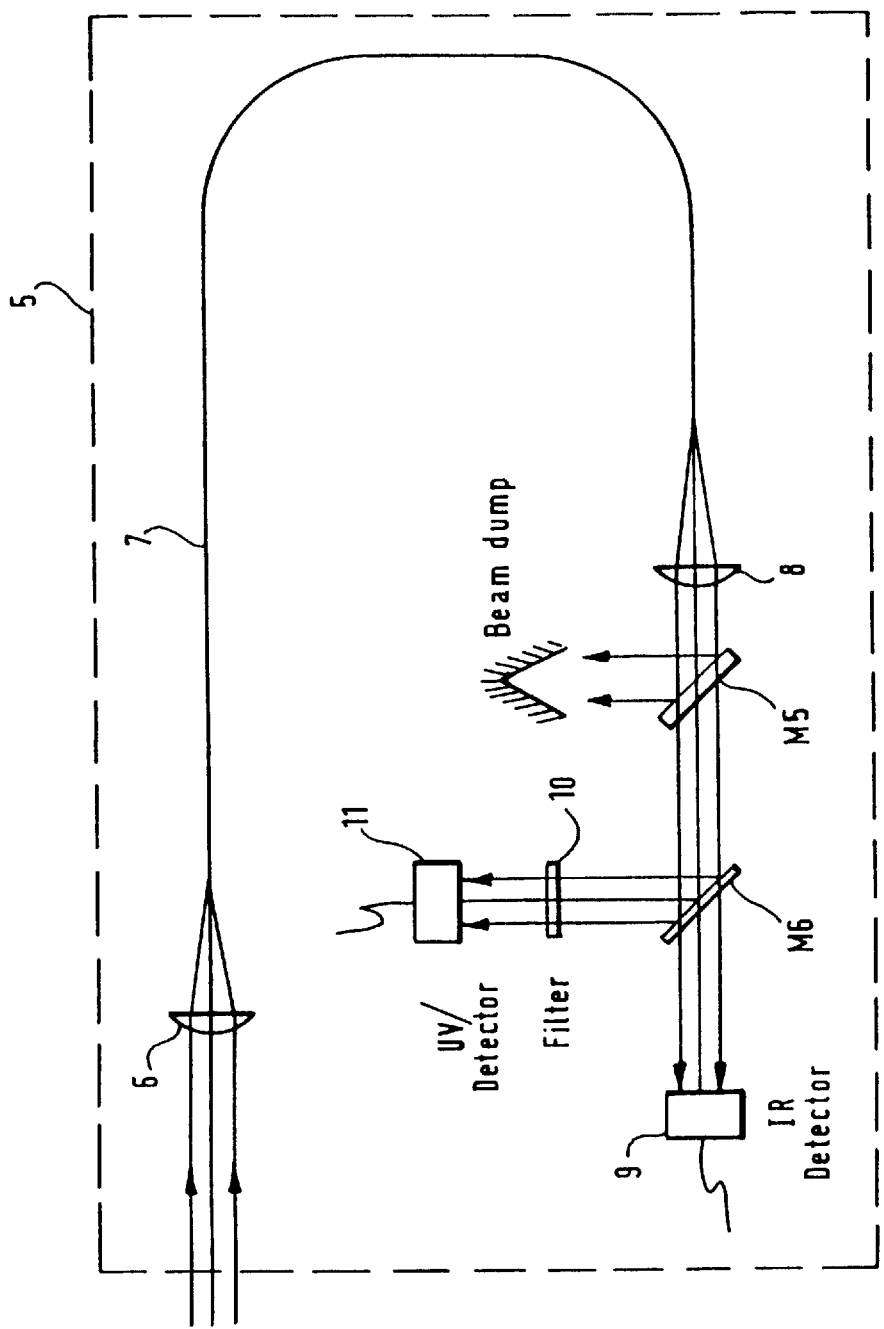
FIG. 4 shows a core power monitor including means for separating out radiation of different wavelengths.

FIG. 1 shows an apparatus that is used for core power monitoring in embodiments of the present invention. In core power monitoring, laser power is conveyed to a workpiece by means of an optical fibre and optical radiation generated by the ensuing process is monitored via the same optical fibre. The term "core" refers to the core of the optical fibre and in core power monitoring the laser radiation, and the monitored radiation in the opposite direction, travels through the core and is confined therein by virtue of total internal reflection at the interface between the core and the annular cladding which surrounds the core. Other techniques may be used, such as cladding power monitoring in which light or radiation returned through the cladding of the fibre is monitored. In other techniques embodying the invention, such as that shown in FIG. 8, means other than optical fibres are used.

In the system shown in FIG. 1, a laser beam 1 from a laser (not shown on the figure) is focused by a lens or lens assembly 2 onto the proximal face of an optical fibre 3. The beam emerges from the distal face of the fibre and passes through a lens assembly L1, L2. The beam is recollimated by first lens L1 and then focused onto a workpiece 4 by means of a second, focusing, lens L2.

The combination of lenses L1 and L2 forms an imaging lens assembly which creates a demagnified image of the fibre core on the workpiece. Correspondingly, the lens combination L1, L2 also forms an image of the irradiated area of the workpiece, which image is located at the plane of the output face of the fibre, exactly superimposed on the fibre core. Thus, if laser radiation is reflected or scattered by the workpiece surface, some of that radiation will be coupled back into the fibre core and travels back, through the fibre, through lens 2 and, in principle, back to the laser itself.

When laser welding takes place, it is a well known phenomenon that the interaction of the beam with the material creates a plume, resembling a visible flame, which extends up to several millimetres from the workpiece surface. By using an arrangement such as that in FIG. 1, some of the radiation from the plume is coupled back into the fibre core by the imaging lens assembly L1, L2 and travels up the fibre to the proximal end. By separating out the plume radiation from the laser radiation, which is possible due to the different wavelengths, the plume radiation may be monitored after it reaches the proximal end of the fibre. Monitoring of the plume characteristics can give valuable information as to the state and quality of the material processing operation.

Plume radiation is not the only radiation generated by the process, however, and radiation may also emanate from the pool of molten material (the weldpool) at the point where the beam is focused on the metal, and from other sources. The process radiation monitored by embodiments of the present invention may include this radiation, in addition to the plume radiation.

The process radiation may be separated from the laser radiation by using mirror arrangements which are highly reflective at one particular wavelength, ie. the laser wavelength, but have significant transmission at other wavelengths. For example, a beam-turning mirror may be used which is highly reflective at the wavelength of the laser used and therefore reflects the laser radiation but transmits other wavelengths, including the plume radiation and other process radiation.

It is presently preferred in embodiments of the invention to use Nd:YAG lasers, operating at wavelengths of 1064 nm, but the invention is applicable to other wavelengths and/or other types of laser. For example, carbon dioxide lasers may be used.

FIG. 2 shows schematically a laser system for welding.

A laser comprises at least one pumping section in the form of a pumping chamber within a laser resonator bounded by two mirrors. In the example shown, a plurality of four pumping chambers P1 to P4 are arranged in series, each of which chamber contains an active laser gain element G and excitation lamps $E_L$. The pumping chambers are arranged between two mirrors M1 and M2 in the normal manner to produce a laser beam through partially transmissive mirror M2. The output of the laser beam itself may be measured by a power monitor PM1. An Nd:YAG laser of this type is manufactured by Lumonics Limited of Cosford Lane, Swift Valley, Rugby, Warwickshire CV21 1QN, England, under the name MULTIWAVE™. The laser beam is directed via beam-turning mirrors M3, M4 to an optical assembly 2 which focuses the beam to the input, proximal, face of an optical fibre 3. The beam emerging from the distal end of the fibre passes through the lens assembly L1, L2 and is focused onto the workpiece 4. Relative movement can then occur between the workpiece and the lens assembly to effect a welding operation. It should be noted that the term 'workpiece' in this specification is intended to include both a single workpiece and a plurality of pieces to be joined by a welding operation.

As described with reference to FIG. 1, the process radiation generated by the welding operation is directed back through lens assembly L1, L2, through optical fibre 3 and optical assembly (lens) 2. Beam turning mirror M4 is chosen to be highly reflective at the chosen laser wavelength of 1064 nm but transmissive of other radiation and therefore transmits the process radiation to a core power monitor 5 where the optical characteristics of the plume can be analysed. Alternatively, a means which transmits the laser radiation and reflects the other wavelengths may be used. The core power monitor is described further below with reference to FIGS. 4 and 5.

The beam focusing arrangements L1 and L2 of FIG. 2 are normally chosen to be achromatic. In the example shown, lenses L1 and L2 are both positive lenses and are cemented Sill achromats. In one embodiment, the focal length of L1 is 160 mm and the focal length of L2 is 80 mm. This lens combination may be regarded as an imaging assembly with a magnification factor of 80/160=0.5. Thus, if the core diameter of the beam delivery fibre is 1 mm for example, then the second lens projects a sharp image of the fibre core, of diameter 0.5 mm, onto a workpiece located in its rear focal plane, 80 mm downstream.

Positive achromats are generally designed to have minimum chromatic aberration. This is achieved by equalising the effective focal lengths of the achromat at at least two wavelengths in the visible spectrum. However, it is important to realise that achromatisation with respect to the two chosen wavelengths does not secure a complete removal of colour aberration. The remaining chromatic aberration is known as the secondary spectrum and is a well known phenomenon. The present invention uses this chromatic aberration to effect focus control.

The process radiation, including the plume resulting from the interaction of the laser beam with the material, comprises not only visible and ultra-violet (UV) radiation but also infrared radiation (IR). The lens assembly L1 and L2 exhibits chromatic aberration in the secondary spectrum so that the different spectral bands of light emanating from the plume/interaction zone are affected by this aberration and are focused differently by the lens arrangement.

FIG. 3(a) is a slightly simplified version of part of FIG. 1. The figure shows the workpiece 4 situated at the focal point of lens L2 and illustrates the envelope of the laser beam 1 from the output face of the optical fibre 3 to the workpiece 4, the beam being of wavelength 1064 nm. FIG. 3(b) illustrates two rays from the infrared (IR) and ultra-violet (UV) bands. In the embodiment shown, the UV band is assumed to include the visible spectrum and includes radiation in the wavelength range 300 to 700 nm while the IR band is in the wavelength range 1100 to 1600 nm. The effective focal length of the lens combination L1, L2 is smaller for the UV band than that for the IR band. As shown in FIG. 3(b), due to this chromatic aberration, the UV rays form an image of the irradiated zone of the workpiece in front of the fibre output face, at plane P1. The IR rays form an image upstream of the output face, at plane P2. At the plane of the output face P3, the "circle of confusion" of the two bands is of similar size, as shown from the figure, and therefore, the amount of radiation in each band entering the core of the optical fibre will be the same. The core of the optical fibre therefore acts as an intensity discrimination means and so signals of equal size may be expected to be detected by the core power monitor for each spectral band, assuming equal light output in each band, equal detector sensitivity and so on. Thus, when the IR and UV signals are subtracted from one another, an error signal $\epsilon$ of zero will be obtained.

In FIG. 3(c) the workpiece has been moved further away from lens L2. This causes the corresponding IR image to move closer to L1, ie. nearer to plane P3 so that the IR image is now located at plane P3 and is coincident with the fibre core. As a result, an increased, maximum, IR signal is detected by the core power monitor since all of the IR power collected by the lenses effectively passes into the discriminating output face of the fibre core. However, the UV image has also moved towards lens L1, causing an increase in the circle of confusion at the face of the fibre and therefore a smaller proportion of the UV radiation to enter the fibre. Thus, a lower quantity of UV radiation enters the fibre face and a lower signal will be detected.

At FIG. 3(d), the workpiece has moved even further away from L2 and from the laser beam focal plane. The result of this is that both the IR and UV images have moved towards L1 and thus the detected signals at the core power monitor will be lower for both of these than for the situation of FIG. 3(c).

In FIG. 3(e), the workpiece has moved back towards L2 so as to be located in front of the laser beams focal plane. This shifts both the IR and UV images away from L1 so that the UV image is now located at the end face of the fibre, giving a maximum UV signal but a lower IR signal. In FIG. 3(f) the workpiece is located even closer to L2, so that both the UV and IR images are formed behind the optical fibre exit face, giving reduced signals from both bands.

It is seen from FIG. 3 that there is one unique position for the workpiece at which the UV signal is a maximum and a different unique position at which the IR signal is at a maximum. Thus, by measuring both signals an error signal can be obtained which can effectively be used to judge whether the beam is in focus at the workpiece or not and can be used to control a feedback loop to move the workpiece relative to the laser beam. The fibre core, being of fixed aperture, acts as an intensity discriminator and therefore enables the core power monitor, situated remotely at the other end of the fibre, to measure intensity effectively at the plane of the fibre output face.

It will be appreciated that it is possible to omit an optical fibre and instead to merely provide a suitable discriminating aperture in addition to, or as an alternative, to the fibre face.

FIG. 6 shows a theoretical plot of the IR and UV signals (and also the 1064 nm signal) generated by the core power monitor as a function of the workpiece position relative to the focus point of the laser beam. FIG. 7(a) shows a simplified (ie. triangular) representation of the plot of FIG. 6 for the IR and UV signals only. The IR and UV signals have been scaled to be equal when the workpiece is at the plane of laser beam focus. FIG. 7(b) illustrates the effect of subtracting the IR signal from the UV signal to generate an error signal $\epsilon$. It should be noted that in the embodiment described, the mean separation for the UV and IR bands is approximately 1 mm. This value may be increased by appropriate choice of lenses L1 and L2, and of the spectral bands selected for monitoring. The characteristic shown in FIG. 7(b) has a central linear region $E_{LIN}$ of steep gradient. In embodiments of the invention, this portion of the error signal characteristic can be used for closed-loop focus control. If the focusing error stays within this linear region, then a system with a suitable feedback means can compute the magnitude and direction of the error and eliminate the error by adjusting the relative separation of the beam focus optics (eg. L1, L2) and the workpiece.

If the focus error does move beyond the boundaries of the linear region, then the control system may be unable to correct the focus error by means of the error signal. However, in such a case by monitoring individual UV and IR signals it is generally possible to bring the focal error back within the linear region $E_{LIN}$ and thus resume focus correction.

FIG. 4 shows schematically an exemplary embodiment of a core power monitor 5. Radiation is reflected, scattered and generated by the workpiece, of which a proportion returns through lenses L1 and L2, optical fibre 3, optical assembly 2 and mirror M4 (all shown in FIG. 2), then through lens 6 to second optical fibre 7 (shown in FIG. 4). The radiation includes radiation of the original laser wavelength (1064 nm in the described embodiment employing a Nd:YAG laser) and also radiation at other wavelengths (including the IR and UV bands as hereinbefore described). The radiation passes through the lens 8 and to mirror M5 which is highly reflective at the laser wavelength but transmits other wavelengths. Laser radiation is therefore reflected by this mirror and the remaining radiation passes through. The light which passes through mirror M5 is split into the desired IR and UV spectral bands by means of a dichroic mirror M6 which in one example is a polysilicon wafer, 0.5 mm thick. The infrared light IR is transmitted through mirror M6 and is detected by an IR detector 9 which is an InGaAs photodiode. The reflected light passes through a filter 10 which confines transmitted light to that in a region below 700 nm and is detected by a detector 11 which is a UV-enhanced silicon photodiode. The filter 10 is a Schott BG40 glass filter. Output signals are then derived from the two photodiodes 9 and 11 and are processed to obtain an error signal.

Figure 5:
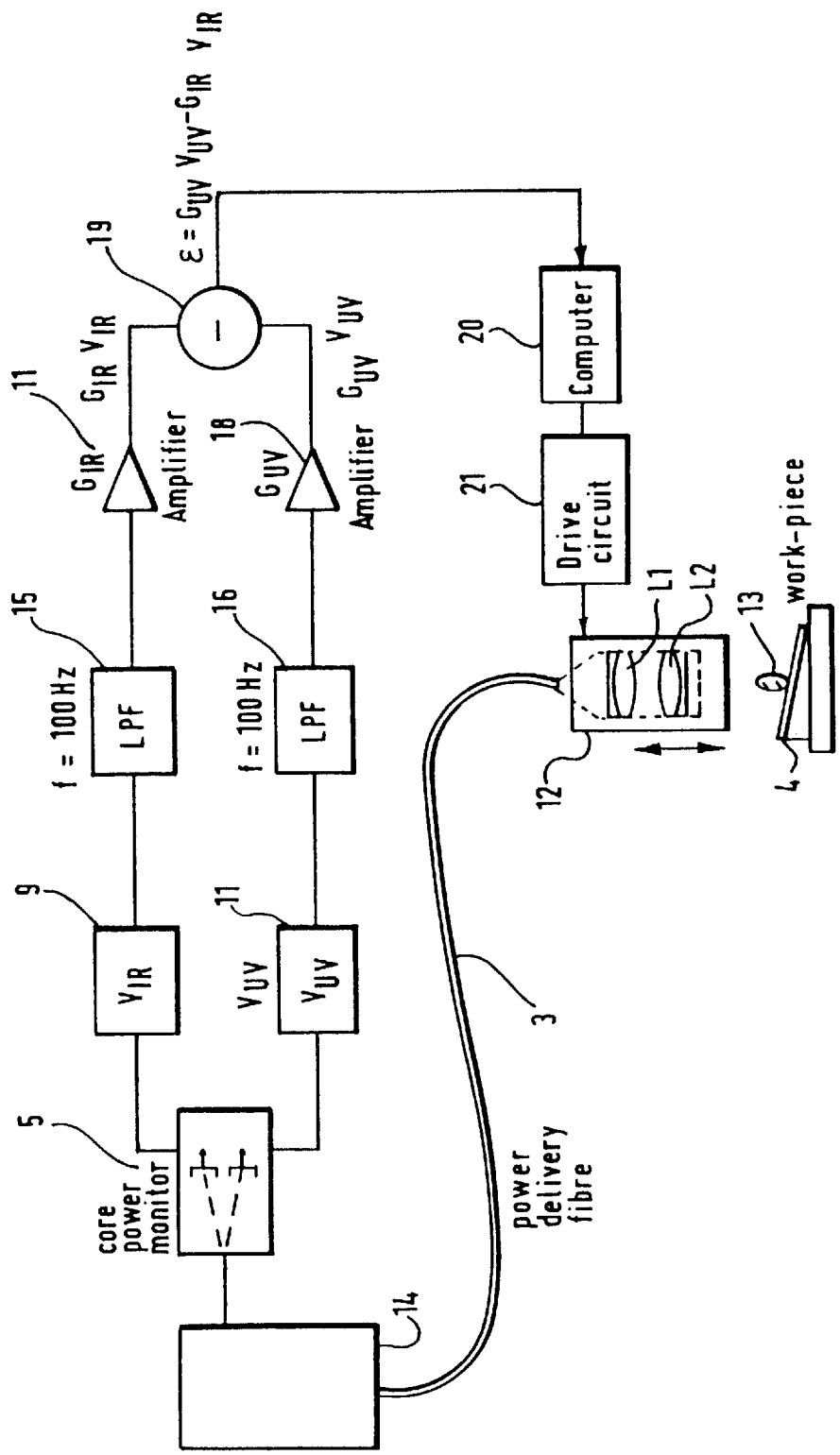
FIG. 5 shows a focus control arrangement in a feedback loop.

One example of the processing apparatus and a feedback loop is shown in FIG. 5. In the figure, the lens arrangement L1 and L2 is mounted within a driven, movable, translation stage 12. The workpiece 4 is translated laterally relative to the translation stage. The figure also shows, schematically, the plume of radiation 13 formed on the workpiece during laser welding. The laser radiation, and IR and UV radiation received back through lenses L1 and L2 and fibre 3 passes back through laser enclosure 14 to core power monitor 5. It should be noted that laser enclosure 14 includes, in addition to the actual laser bounded by mirrors M1 and M2, the optical arrangement 2 within it. The UV and IR signals are separated in the core power monitor 5 as described in relation to FIG. 4 and detected to obtain respective signals $V_{IR}$, representative of the IR radiation, and $V_{UV}$, representative of the UV at respective photodiodes 9 and 11. The output from each of these photodiodes is low-pass filtered to remove high frequency components greater than 100 Hz at respective filters 15 and 16. These high frequency components are believed to be associated with oscillations both in the keyhole and in the weld pool. Filters 15 and 16 are first order, with a cut-off at 100 Hz, chosen to be well below the mean oscillation frequency. After filtering, both signals are amplified at respective amplifiers 17 and 18 and are equalised so that they are equal at zero focal error. They are then applied to a subtractor 19 which subtracts one signal from the other to result in an error signal $\epsilon$ which is of zero value when the workpiece is in focus, ie. located at the optimum laser beam focal plane.

The resulting error signal $\epsilon$ is applied to a computer 20, typically as an analogue input. The analogue signal is sampled by the computer to obtain a sampled digital signal which is used to calculate the corresponding focus error and to control a drive circuit 21 which adjusts the translation stage 12 to alter the distance between the beam focus assembly and the workpiece.

The error signal is preferably sampled, processed and output to the motorised translation stage 12 every 10 ms to keep the laser beam at its optimum focal position. The sampling rate can, of course, be varied from this value.

Figure 8:
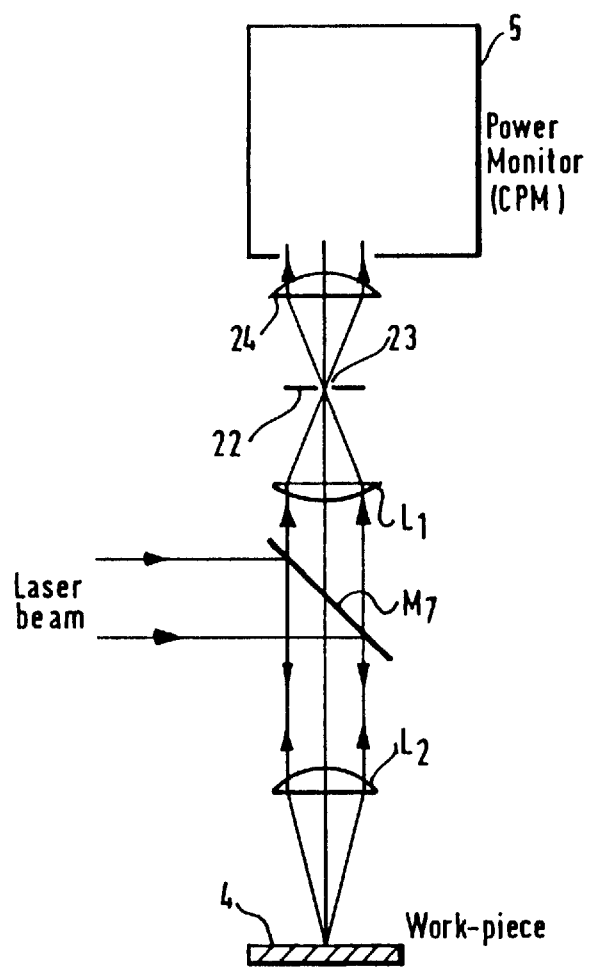
FIG. 8 shows an alternative embodiment.

FIG. 8 shows an alternative embodiment in which the intensity discriminator is not a fibre. In this example, the laser beam to be used for welding a workpiece is directed to the workpiece by means of a mirror M7 and lens L2. The mirror is reflective at the laser wavelength but transmissive of other wavelengths. UV and IR radiation from the workpiece is transmitted through mirror M7 and is focused through an aperture 23 formed in a discriminating plate 22 by lens L1. Aperture 23 serves the same purpose as the output face of the core of an optical fibre in other embodiments. The UV and IR radiation then passes to a core power monitor 5, via a further lens 24 which recollimates the radiation. In this case, lenses L1 and L2 are designed to have adequate chromatic aberration. This type of arrangement is suitable for lasers such as carbon dioxide lasers.

It will be appreciated that the core power monitor of FIG. 4 is by way of example only and many different monitors may be used which can isolate and detect light in the chosen spectral bands. In particular, optical fibre 7 allows all the components of the core power monitor 5 except lens 6 to be located remote from the laser enclosure 14, for convenience.

In other examples, and as described above, where an optical fibre is used to deliver the laser beam to the workpiece, the process radiation may be monitored via the cladding, rather than the core, of the fibre. In these cases, the limiting, discriminating, aperture for intensity measurement is the annular cross-section of the cladding layer.

In a variation, the plume radiation is monitored in more than two spectral regions, for example three or more. In these cases, if, say, three regions A, B and C are used, then regions A and B may, for example, be used normally for fine control and A and C for coarse control.

In some embodiments of the invention, the focus control feedback loop may be omitted so that the error signal is used merely to monitor changes in focus and does not serve to act as a control signal to alter the focus. This may be useful for passive monitoring, or experimental purposes for example.

The optical assembly which introduces the chromatic aberration used by the present invention need not include just lenses, such as lenses L1 and L2 but may additionally or alternatively comprise other optical elements, such as diffractive or holographic optical elements.

We claim:

1. Apparatus for monitoring the focus of a laser beam comprising beam delivery apparatus forming a beam delivery path for delivering a laser beam to a workpiece, the beam delivery apparatus including an optical assembly having chromatic aberration and being arranged so that at least a portion of optical radiation generated at the workpiece by virtue of interaction between the workpiece and the laser beam is transmitted back through the optical assembly; an intensity discriminating aperture; means for separating the received optical radiation, after passing through the aperture, into at least two spectral bands; means for detecting the respective powers of the received radiation of the at least two spectral bands and generating electrical signals representative of said powers, and means for generating, from the electrical signals, an error signal representative of the separation of the focus of the laser beam from the workpiece.

2. Apparatus as claimed in claim 1 and further wherein the laser beam has a focus position and comprising means responsive to the error signal to alter the focus position of the laser beam.

3. Apparatus as claimed in claim 2 wherein the discriminating aperture is formed by a face of the core or cladding portion of an optical fibre through which the laser beam passes towards the workpiece and the generated radiation passes from the workpiece.

4. Apparatus as claimed in claim 2 comprising means for separating the generated radiation from any laser beam radiation.

5. Apparatus as claimed in claim 4 wherein said separating means comprises an optical means which is reflective at one wavelength or range of wavelengths but transmissive at other wavelengths.

6. Apparatus as claimed in claim 4 comprising means for separating the optical radiation into the at least two spectral bands and means for detecting the respective powers of the two bands.

7. Apparatus as claimed in claim 6 wherein one spectral band is infrared (IR) in the wavelength range 1100 to 1600 nm and the other band is in the ultraviolet or visible spectrum of wavelength range 300 to 700 nm, the laser radiation lying between or outside of said bands.

8. Apparatus as claimed in claim 6 wherein the IR detector is an InGaAs photodiode.

9. Apparatus as claimed in claim 6 wherein the UV/visible light detector is a UV-enhanced silicon photodiode.

10. Apparatus as claimed in claim 1 wherein the power-representative electrical signals are passed to respective low pass filters, amplified and applied to a subtracting means which subtracts one signal from the other to obtain the error signal.

11. Apparatus as claimed in claim 2 wherein the optical assembly is movable relative to the workpiece to alter the focus position of the laser beam relative to the workpiece and is movable by virtue of a drive means driven in response to the error signal.

12. Apparatus as claimed in claim 1 wherein the aperture is provided by a plate having an aperture formed therein.

13. Apparatus as claimed in claim 1 wherein the generated radiation is, at least partly, from a plume formed at the workpiece.

14. Apparatus as claimed in claim 1 wherein the optical assembly having chromatic aberration is a lens or lens assembly.

15. A method of monitoring the focus of a laser beam; wherein the laser beam is delivered through a beam delivery path to a workpiece, the beam delivery path including an optical assembly having chromatic aberration and being arranged so that at least a portion of optical radiation generated at the workpiece by virtue of an interaction between the workpiece and laser beam is transmitted back through the optical assembly; which method comprises passing the generated optical radiation through a discriminating aperture; separating the optical radiation into at least two spectral bands differently affected by the aberration of the optical assembly; detecting the respective powers of the radiation of the at least two spectral bands at the aperture and generating therefrom an error signal representative of the separation of the focus of the laser beam from the workpiece.

16. A method as claimed in claim 15 wherein the discriminating aperture is formed at the face of a core or cladding portion of an optical fibre through which the laser beam passes towards the workpiece and through which at least some of the generated radiation passes from the workpiece.

17. A method as claimed in claim 15 further including a method for controlling the focus of the laser, comprising the step of using the error signal to alter the focus position of the laser beam.

18. A method as claimed of claim 15 wherein the monitored radiation is at least partly from a plume produced at the workpiece.

* * * * *

UNITED STATES PATENT AND TRADEMARK OFFICE
CERTIFICATE OF CORRECTION

PATENT NO. : 5,850,068
DATED : December 15, 1998
INVENTOR(S) : Peters et al.

It is certified that error appears in the above-identified patent and that said Letters Patent is hereby corrected as shown below:

On the title page, in section "[30] Foreign Application Priority Data," delete "Jul. 6, 1996" and insert --June 7, 1996--.

Signed and Sealed this

Fourth Day of May, 1999

Attest:

Attesting Officer

Q. TODD DICKINSON
Acting Commissioner of Patents and Trademarks